United States Patent [19]  
Vinton et al.

[11] 4,154,704  
[45] May 15, 1979

[54] ACTIVATED RETICULATED OR UNRETICULATED CARBON STRUCTURES

[75] Inventors: Clarence S. Vinton; Charles H. Franklin, both of Ann Arbor, Mich.

[73] Assignee: Chemotronics International, Inc., Ann Arbor, Mich.

[21] Appl. No.: 871,190

[22] Filed: Jan. 23, 1978

[51] Int. Cl.$^2$ .................... C01B 31/08; C01B 31/10; B01J 21/18
[52] U.S. Cl. .......................... 252/444; 55/67; 210/39; 210/40; 252/421; 252/445; 264/29.1; 423/445
[58] Field of Search .................. 252/421, 445, 444; 423/445, 449; 264/29.1; 55/67; 210/39, 40

[56] References Cited

U.S. PATENT DOCUMENTS

| | | | |
|---|---|---|---|
| 3,859,421 | 1/1975 | Hucke | 264/29.1 |
| 3,922,334 | 11/1975 | Marek et al. | 423/445 |
| 3,937,439 | 2/1976 | Tyer et al. | 252/421 |
| 3,960,768 | 6/1976 | Ripperger et al. | 252/421 |
| 4,064,043 | 12/1977 | Kollman | 210/40 |
| 4,067,956 | 1/1978 | Franklin | 423/449 |

*Primary Examiner*—Floyd D. Higel
*Assistant Examiner*—P. E. Konopka
*Attorney, Agent, or Firm*—Ian C. McLeod

[57] ABSTRACT

Novel activated carbon reticulated or unreticulated structures with interconnected cells are described. The carbon skeletal structures which are activated are derived from the carbonization of a parent homogeneous alloy of a furan resin with a polyurethane resin as a foam structure or as a skeletal structure with the foam membranes removed. Activation of the carbon structure during or after carbonization, is in contact with an oxidizing agent. The resulting activated carbon structures have unexpectedly high compressive strengths coupled with high activated surface areas per unit mass and volume and are particularly useful as adsorbents for chemicals in solution or as a gas.

14 Claims, No Drawings

ACTIVATED RETICULATED OR UNRETICULATED CARBON STRUCTURES

BACKGROUND OF THE INVENTION

The present invention relates to novel interconnected cell activated reticulated or unreticulated carbon structures having a uniquely high combination of compressive strength and of activated surface area per unit mass and volume. In particular, the present invention relates to such carbon structures derived by carbonization from an alloy of a polyurethane resin and a furan resin in the form of a foam structure with membranes or a skeletal structure without membranes.

Activated carbon is well known and is carbon which has been activated by oxidation. The activation process usually destroys some of the carbon to provide a channeled mass which adsorbs chemicals from solution or from a gas. The surface area per unit mass or volume is a measure of the ability of the activated carbon to adsorb various chemicals. The level of such activation is highly unpredictable and depends upon the parent carbonizable structure from which it was derived and the specific process of activation. Because the process is destructive, the carbon structure physical strength is reduced as the level of activation is increased.

U.S. Pat. No. 2,365,729 (1944) to Schumacher et al describes catalytic activated carbon particles prepared by heating in the presence of an oxygen containing oxidizing agent, such as heating in air at between about 200° C. and 450° C., and then a subsequent special heat treatment in the absence of air or other oxidizing media at a critical temperature of 925° C. to 1000° C. The activated carbons so produced are disclosed to function as catalysts in the oxidation of inorganic compounds such as ferrous iron to ferric iron. It would be desirable to have a unitary, strong porous structure with this property.

U.S. Pat. No. 3,778,387 (1973) to Urbanic et al describes air oxidized activated carbon particles which are rendered antioxident by treatment of the activated carbon particles with a ketone which is adsorbed on the particles but which does not interfere with the adsorption of other compounds. The activation of the carbon particles is at a temperature of 100° C. to 600° C. Again it would be desirable to provide a unitary strong structure of this kind as well.

U.S. Pat. No. 3,917,806 (1975) to Amagi et al describes a porous carbon molding, which is derived from a porous pitch by carbonization in contact with an oxidizing agent, such as steam vapor at 850° C. for 8 hours or such as air. The porous carbon structures have activated surface areas of around 1,100 square meters per gram. These porous carbons from pitch are likely to exhibit a variance in the activity and cell size from batch to batch and even within portions of the sample, and have a relatively high bulk density of about 1.7 gm/cc as shown in Examples 6 and 7 of the patent.

U.S. Pat. No. 3,960,761 (1976) to Burger et al describes forming molded beads of carbon particles and thermosetting resin binder which are activated by heating with steam or with carbon dioxide as the oxidizing agent. The binder is a phenolic fusible or thermosetting resin and the activation temperatures are between 700° C. to 1200° C. The carbon structures are substantially non-porous and as a result have high compressive strengths.

U.S. Pat. No. 4,029,600 to Schmitt et al (1977) describes the use of various oxidizing agents, such as oxygen, carbon dioxide, steam and the like for activating carbon particles which are to be bonded. The carbon structures are made of spherical activated carbon particles bonded with a carbonizable binder and then heated at 600° C. in a non-reactive atmosphere. The resulting activated carbon products have relatively low compressive strengths and activated surface areas ranging up to about 1300 square meters per gram. Bound oxygen on the surface of the activated carbon is disclosed to render the surface more adsorbent to polar compounds and less adsorbent to non-polar compounds.

U.S. Pat. No. 3,922,334 to Marek et al (1975) describes reticulate carbon skeletal structures which are similar in geometry to those of the present invention. These skeletal structures are formed by infusing a polyurethane resin reticulate structure with a phenolic resin dissolved in a solvent and then carbonizing the infused structure. The infused or the carbonized reticulate structures are activated with an oxidizing agent at around 825° C. to 900° C. As can be seen from Table IV of this patent, the activated structures have a maximum activated surface area of 1416 square meters per gram and have low compressive strengths for the most active structures. There is also a very large activation weight loss for the most active structures and the resulting structures are so fragile that they break merely as a result of handling. The Marek activated carbon reticulate structure geometry is nevertheless very desirable; however, because of the inherently destructive nature of oxidation of the carbon skeletal structures to achieve satisfactory activation the resulting structures were of necessity very fragile.

OBJECTS

It is therefore an object of the present invention to provide novel activated reticulated and unreticulated carbon structures which have high surface areas per unit mass and volume and yet have up to about ten (10) times the compressive strengths of the prior art phenolic resin derived reticulate activated carbon structures. It is further an object of the present invention to provide novel activated carbon structures which have unique selective adsorption characteristics. Further still, it is an object of the present invention to provide activated carbon structures which can be treated to make them oxidative or non-oxidative according to the prior art methods. These and other objects will become increasingly apparent by reference to the following description.

DESCRIPTION OF THE INVENTION

The present invention relates to the improvement in a carbon structure which has crack-free, interconnected strands of carbon forming a skeletal structure to which membranes may or may not be attached and which is derived from and which geometrically reproduces upon carbonization the identical form or the compressed form of a furan resin homogeneously alloyed with a polyurethane resin in the form of a parent skeletal structure with or without foam membranes attached to the skeletal structure and which comprises: an activated carbon skeletal structure derived by the heating of the carbon skeletal structure of the alloyed parent skeletal structure in contact with an oxidizing agent while retaining the geometry of the unactivated structure.

PARENT CARBON SKELETAL STRUCTURES FOR ACTIVATION

The foam and/or reticulate skeletal structure alloy of the furan resin and the polyurethane resin can be prepared by: (1) foaming a mixture of the liquid resins directly; or, (2) by infusing a preformed flexible polyurethane resin foam or skeletal structure which is either reticulated or unreticulated. Reticulation by removal of membranes from furan resin infused foams can be achieved by the ignition of a combustible gas in the foam as set forth in pending U.S. application Ser. No. 782,624, filed Mar. 30, 1977 and assigned to a common assignee. Reticulation of polyurethane foams is well known to those skilled in the art.

Our U.S. Pat. No. 3,927,186 describes a rapid method for forming carbon skeletal structures from flexible polyurethane resin reticulate structures, which faithfully reproduces the geometry of the uncarbonized polyurethane resin strands, the first step of which comprises infusing the polyurethane resin skeletal structure with a curable furan resin or resin precursor, particularly furfuryl alcohol with a catalyst. The furan resin as a curable liquid resin or resin precursor swells the polyurethane strands during infusion and forms a gel-like alloy structure with the polyurethane resin as the solid phase. An important step in the method, which assists in preventing cracking during carbonization and which is essential to faithful reproduction of the strand geometry is the substantial removal of the liquid resin or resin precursor coating from the polyurethane skeletal structure strand surfaces after the infusion or swelling step. The infused weight is up to about 6 times the weight of the uninfused polyurethane structure. The method allows rapid carbonization under neutral or reducing conditions with less than about five hours heating of the infused structures without cracking. The resulting carbon structures remain crack-free and strong even when exposed to rapid temperature variations. The carbonized structures are preferably in the form of vitreous or glassy carbon and are the preferred structures for activation.

Our U.S. Pat. No. 4,022,875 describes a rapid method for forming vitreous carbon foams from flexible interconnected cell polyurethane foams having membranes from foaming dividing contiguous cells, which faithfully reproduces the geometry of the uncarbonized polyurethane foams, by infusing the polyurethane foams with substantially unresinified or unpolymerized furfuryl alcohol which is capable of resinification at temperatures above room temperature. An important step in the method which permits rapid carbonization without cracking and which is essential to faithful foam geometry reproduction is the substantial removal of the liquid non-infused furfuryl alcohol from the polyurethane foam surfaces after the infusion or swelling step. The infused weight is up to about 6 times the weight of the uninfused polyurethane structure. The carbonized foam is in the form of vitreous, disordered or glassy carbon and is particularly useful for activation.

U.S. Pat. No. 4,067,956 assigned by one of the inventors herein to a common assignee, describes a microporous carbon structure composed of bent or crimped strands. The structure has the same form as substantially compression bent strands of a flexible reticulated polyurethane microporous structure from which it is derived. Preferably the strand compression is sufficient for interbonding of the bent strands which overlay each other. The carbon structure is derived by providing a compressed polyurethane structure composed of the bent strands infused with a liquid thermosetting resin or resin precursor, removing any excess liquid from the surfaces of the strands; and then carbonizing the strands at elevated temperatures. The microporous structures are relatively unreactive under reducing or neutral conditions and are particularly useful for activation.

The carbon structures derived by methods where the infusant thermosetting resin is removed from the surfaces of the strands of an infused reticulated or unreticulated structure are particularly preferred for activation. It is believed that the carbonization under neutral or reducing conditions produces a product with a channeled interior and with a nonporous surface skin. Activation is believed to essentially render the surface skin more porous and the resulting structures are selectively adsorptive as discussed hereinafter.

The preparation of furan resin and polyurethane resin interconnected cell foams which can be activated is described in numerous prior art patents, for instance U.S. Pat. Nos. 3,345,440 (1967) to Googin et al; 3,574,548 (1971) to Sands et al; 3,635,676 (1972) to Sands; 3,632,385 (1972) to Schmitt et al. These foam structures can be activated directly or can be reticulated and then activated.

ACTIVATED CARBON SKELETAL STRUCTURES

The parent carbon skeletal structures are heated in contact with an oxidizing agent to activate them. The alloyed parent skeletal structures can also be heated with an oxidizing agent to simultaneously activate and carbonize these structures in the manner of U.S. Pat. No. 3,922,334 (1975) to Marek et al.

The preferred oxidizing agent is air; however, carbon dioxide, steam and other known oxidizing agents can be used, preferably those oxidizing agents which leave the activated structure substantially free of contaminants derived from the oxidizing agent, unless they will impart a desired catalytic property to the product. The activation is accomplished at a temperature of at least about 100° C. and preferably between about 100° C. to 600° C.

The preferred activated carbon skeletal structures geometrically reproduce the identical geometry of a polyurethane reticulate skeletal structure, which has a bulk density of up to about 0.16 gm/cc, wherein the strands have a diameter of up to about 0.1 cm and which has a mean spacing between the strands of up to about 0.25 cm. A particular activated reticulate carbon skeletal structure has a mean spacing of the strands of between about 0.03 and 0.25 cm and an air flow through the structure for a sample of the dimensions 1 cm square by 1 cm thick of 1,100 liters per hour with a differential pressure drop across the thickness of the sample of 5 mm of mercury for the 0.03 cm spacing and 9,600 liters per hour with a differential pressure drop of 20 mm of Hg for the 0.25 cm spacing. The word "geometry" means the same shape, but not necessarily the same size or thickness of the strands forming the skeletal structure.

The degree of activation of the carbon structures of the present invention is to produce a minimum activated surface area of about 400 square meters per gram and a minimum crushing strength of about 3.5 kilograms per square centimeter. The preferred activated reticulate carbon structures have a minimum activated surface area of about 1000 square meters per gram and the most preferred have an activated surface area of between about 2000 and 4500 square meters per gram and a crushing strength of at least about 4.5 kilograms per square centimeter. These structures also exhibit selective adsorptivity as discussed hereinafter.

SPECIFIC DESCRIPTION

EXAMPLE 1

This example illustrates the most preferred method for the preparation of an activated reticulated carbon skeletal structure using catalyzed furfuryl alcohol.

A sample of reticulated polyester polyurethane foam having about 40 pores per centimeter (100 pores per inch) was saturated with furfuryl alcohol catalyzed with one percent (1%) methylparatoluenesulfonate, after which it was removed from the bath, the excess furfuryl alcohol was then removed by squeezing against an absorbent material and the sample was placed in an autoclave at ambient temperature under an atmosphere of nitrogen. The temperature was raised to 150° C. in 6 hours and held at 150° C. for 6 hours. The autoclave was then allowed to cool and the sample was removed. This treatment resinified the furfuryl alcohol and rigidified the sample, after which it was placed in a covered steel retort and then carbonized in a furnace which initially was at room temperature when the sample was placed in it and then was heated to 1000° C. in 6 hours, whereupon, it was removed from the furnace, cooled and examined. (The actual carbonization period was shorter than 6 hours). The pyrolysis products produced an atmosphere which substantially prevented oxidation of the sample. The following is the data on the sample:

| | |
|---|---|
| Starting weight | 9.43 grams |
| Starting dimensions | 5.1 cm × 5.2 cm × 5.2 cm |
| Resinified weight | 49.04 grams |
| Resinified dimensions | 7.1 cm × 7.0 cm × 6.9 cm |
| Final weight, carbonized | 12.35 grams |
| Final dimensions | 5.2 cm × 5.5 cm × 5.4 cm |
| Product bulk density | 0.080 gm/cm$^3$ |

The sample was cut into three pieces, one piece was retained as a control, two pieces activated by heating them in an air oven that had been heated to 370° C. using carbon spacers between sheets to allow free exchange of air but without introducing forced air. One piece of the sample was removed after 20 hours and the remaining piece was removed after 40 hours. The three pieces were tested as shown in the following Table I:

TABLE I

| | Control | Activated 20 hrs. at 370° C. | Activated 40 hrs. at 370° C. |
|---|---|---|---|
| Density | 0.080 gm/cm$^3$ | 0.078 | 0.077 |
| Crush Strength | 85 psi (5.98 kg/cm$^2$) | 81 (5.69 kg/cm$^2$) | 72 (5.06 kg/cm$^2$) |
| B.E.T. Area | 0.25 meters$^2$/gm krypton | 476 m$^2$/gm N$_2$ | 4521 m$^2$/gm N$_2$ |

In an equivalent manner, vitreous carbon structures were prepared having 24 and 32 pores per centimeter. The 32 and 24 pore per centimeter products also had high adsorptivity when activated for a long period of time. The other properties are shown in Table II, wherein even extended activation yielded strong products.

TABLE II

| | Control | 70 hr. Activation at 370° C. |
|---|---|---|
| 32 pores/cm. | | |
| Density | 0.110 gm/cm$^3$ | 0.106 gm/cm$^3$ |
| Crushing Strength | 165 psi (11.6 kg/cm$^2$) | 108 psi (7.59 kg/cm$^2$) |
| 24 pores/cm. | | |
| Density | 0.098 gm/cm$^3$ | 0.095 gm/cm$^3$ |
| Crushing Strength | 79 psi$_2$(5.55 kg/cm$^2$) | 50 psi (3.51 kg/cm$^2$) |

EXAMPLE II

A sample was tested for adsorptivity of creatinine and vitamin B$_{12}$ and was found to be selectively adsorptive. In the first test the vitreous carbon was cut into small rectangular blocks, each weighing one (1) gram. For the second test, the small one (1) gram cuboids were further cut into even smaller pieces. The test solutions were:

creatinine (20 mg%) in phosphate buffer at pH 7.4; and vitamin B$_{12}$ (10 mg%) in phosphate buffer at pH 7.4.

During the adsorption test, the samples were shaken in a bath at 37° C.

The activated carbon samples were added to the solutions. The one gram activated carbon sample was added to a 25 ml solution of vitamin B$_{12}$. It was found that it did not adsorb vitamin B$_{12}$. For creatinine the method of Folin and Wu, modified by Hawk and adapted to the C. Erba model 1512 autoanalyzer was followed. For vitamin B$_{12}$ the method of the U.S. Pharmacopeia using a Beckman DU spectrophotometer was followed. The adsorption results are shown in Table III.

TABLE III

| | Milligram Percent Creatinine In Solution | |
|---|---|---|
| Time (Min.) | Run 1 | Run 2 |
| 5 | 18 | 14.5 |
| 10 | 16.2 | 10.1 |
| 30 | 14.6 | 7.5 |
| 60 | 12.5 | 5.1 |
| 180 | 7.5 | 1.5 |
| 300 | 4.4 | 0.5 |

Run 1 - The Samples were 2.4 cm × 5.0 cm × 0.8 cm.
Run 2 - A sample the size of Run 1 was cut into 20 smaller pieces of about equal size. It was apparent that by reducing the size of the sample of Run 1, a larger internal strand area was exposed which increased adsorptivity.

From these adsorption experiments, it was concluded that the activated carbon is very effective at adsorbing low molecular weight compounds (e.g. creatinine and compounds of comparable molecular size), and the activated carbon is ineffective in adsorbing middle molecular weight species with the molecular size of vitamin B$_{12}$. Since the majority of exogenous toxins are of low molecular weight (barbiturates, salicylates) this type of activated carbon is very useful.

We claim:

1. In a carbon structure which has crack-free, interconnected strands of carbon forming a skeletal structure with or without carbon membranes on the strands and which is derived by carbonization from and which geometrically reproduces the identical form or the compressed form of a furan resin homogeneously alloyed with a polyurethane resin as an interconnected strand parent skeletal structure with membranes on the skeletal structure from foaming or with the membranes removed, the improvement which comprises:

an activated carbon skeletal structure derived by the heating of the carbon skeletal structure or the parent skeletal structure with carbonization in contact with a gaseous oxidizing agent which leaves the activated carbon structure substantially free of non-adsorbed contaminants derived from the oxidizing agent while retaining the geometry of the unactivated structure, wherein the oxidizing agent and heating are selected to produce a carbon structure with a minimum activated surface area of about 400 square meters per gram combined with a crushing strength of at least about 3.5 kg per square centimeter.

2. The activated carbon skeletal structure of claim 1 which has been heated in contact with the oxidizing agent to at least about 100° C.

3. The activated carbon of claim 1 which has been heated in contact with the oxidizing agent sufficiently to provide adsorption of low molecular weight compounds comparable in molecular size to creatinine from an aqueous solution buffered at pH 7.4.

4. The activated carbon of claim 1 which has been heated sufficiently to provide adsorption of compounds having an effective molecular size less than that of vitamin $B_{12}$ from an aqueous solution buffered at pH 7.4.

5. The activated carbon of claim 1 wherein the carbon skeletal structure has been heated in contact with an oxygen containing atmosphere as the oxidizing agent.

6. The activated carbon of claim 5 wherein the oxygen containing atmosphere is air and the heating is at between about 100° C. and 600° C.

7. In a carbon structure which has crack-free, interconnected strands of carbon forming a skeletal structure with or without carbon membranes on the strands and which is derived by carbonization from and which geometrically reproduces the identical form or the compressed form of a parent flexible polyurethane foam derived skeletal structure with or without membranes on the skeletal structure from foaming and which prior to carbonization has been infused with a furan resin or furan resin precursor such that the parent infused polyurethane structure is substantially free of a surface coating of furan resin or furan resin precursor on the strands and has a weight of the polyurethane structure and infused furan resin or resin precursor of up to about six times that of the polyurethane structure alone, the improvement which comprises:

an activated carbon skeletal structure derived by the heating of the carbon skeletal structure in contact with a gaseous oxidizing agent which leaves the activated carbon structure substantially free of non-adsorbed contaminants derived from the oxidizing agent while retaining the geometry of the unactivated carbon structure, wherein the oxidizing agent and heating are selected to produce a carbon structure with a minimum activated surface area of about 400 square meters per gram combined with a crushing strength of at least about 3.5 kilograms per square centimeter.

8. The activated carbon structure of claim 7 which geometrically reproduces the identical form of the polyurethane skeletal structure, which has a bulk density of up to about 0.16 gm/cc, wherein the strands have a diameter of up to about 0.1 cm and which has a mean spacing between the strands of up to about 0.25 cm.

9. The activated carbon structure of claim 8 which is without the membranes and which has a mean spacing of the strands of between about 0.03 and 0.25 cm and an air flow through the structure for a sample of the dimensions 1 cm square by 1 cm thick of 1,100 liters per hour with a differential pressure drop across the thickness of the sample of 5 mm of mercury for the 0.03 cm spacing and 9,600 liters per hour with a differential pressure drop of 20 mm of Hg for the 0.25 cm spacing.

10. The activated carbon of claim 7 wherein the carbon skeletal structure has been heated in contact with an oxygen containing atmosphere as the oxidizing agent.

11. In a carbon structure which has crack-free, interconnected strands of carbon forming a skeletal structure with or without carbon membranes on the strands and which is derived by carbonization from and which geometrically reproduces the identical form or the compressed form of a parent foamed mixture of a polyurethane and a furan resin or furan resin precursor with or without foam membranes on the skeletal structure from foaming, the improvement which comprises:

an activated carbon skeletal structure derived by the heating of the carbon skeletal structure with a gaseous oxidizing agent which leaves the activated carbon structure substantially free of non-adsorbed contaminants derived from the oxidizing agent while retaining the geometry of the unactivated carbon structure, wherein the oxidizing agent and heating are selected to produce a carbon structure with a minimum activated surface area of about 400 square meters per gram combined with a crushing strength of at least about 3.5 kg per square centimeter.

12. The activated carbon structure of claim 11 which geometrically reproduces the identical form of the skeletal structure, which has a bulk density of up to about 0.16 gm/cc, wherein the strands have a diameter of up to about 0.1 cm and which has a mean spacing between the strands of up to about 0.25 cm.

13. The activated carbon structure of claim 12 which is without the membranes and which has a mean spacing of the strands of between about 0.03 and 0.25 cm and an air flow through the structure for a sample of the dimensions 1 cm square by 1 cm thick of 1,100 liters per hour with a differential pressure drop across the thickness of the sample of 5 mm of mercury for the 0.03 cm spacing and 9,600 liters per hour with a differential pressure drop of 20 mm of Hg for the 0.25 cm spacing.

14. The activated carbon of claim 11 wherein the carbon skeletal structure has been heated in an oxygen containing atmosphere as the oxidizing agent.

* * * * *